United States Patent [19]
Westlund

[11] Patent Number: 5,945,767
[45] Date of Patent: Aug. 31, 1999

[54] ELECTRICAL DEVICE AND METHOD OF MAKING ELECTRICAL DEVICE, AND METHOD OF CONVERTING ENERGY

[76] Inventor: Fred G. Westlund, P. O. Box 5448, Pine Mountain Club, Calif. 93222

[21] Appl. No.: 08/755,323

[22] Filed: Nov. 22, 1996

[51] Int. Cl.[6] .................................................. H02N 1/04
[52] U.S. Cl. ...................... 310/306; 310/309; 136/201; 136/205
[58] Field of Search ................................. 136/200, 201, 136/205, 223; 310/306, 308, 309, 307

[56] References Cited

U.S. PATENT DOCUMENTS

| | | | |
|---|---|---|---|
| 3,188,539 | 6/1965 | Oxley | 317/248 |
| 3,214,656 | 10/1965 | Caron | 317/248 |
| 3,449,174 | 6/1969 | Kleinle | 136/228 |
| 4,281,280 | 7/1981 | Richards | 322/2 R |
| 4,686,847 | 8/1987 | Besocke | 73/23 |
| 4,920,450 | 4/1990 | Masiulis | 361/282 |
| 5,288,336 | 2/1994 | Strachan et al. | 136/200 |
| 5,637,946 | 6/1997 | Bushman | 310/306 |

*Primary Examiner*—Kathryn Gorgos
*Assistant Examiner*—Thomas H Parsons
*Attorney, Agent, or Firm*—Merchant & Gould

[57] ABSTRACT

A device that allows limited flow of free electrons between the plates of a converter is disclosed. The converter converts constant temperature ambient heat into electrical energy which is available to drive electrical devices.

16 Claims, 3 Drawing Sheets

ELECTRICAL DEVICE AND METHOD OF MAKING ELECTRICAL DEVICE, AND METHOD OF CONVERTING ENERGY

BACKGROUND OF THE INVENTION

1. Field of the Invention

This invention relates in general to an electronic device, and more particularly, to a converter that converts constant temperature ambient heat into electrical energy.

2. Description of Related Art

Devices that convert heat into electricity are usually used as thermocouples. Thermocouples are usually used to measure temperature at remote locations, and require two different temperatures to operate. However, the electrical properties of the thermocouple materials, typically iron and constantan, are used mainly to measure a difference in temperature, and not for the conversion of constant temperature ambient heat (CTAH) into electricity for electrical power output. It can seen then that there is a need for a device that can convert constant temperature ambient heat into electricity. It can also be seen that there is a need to transfer electrons or electricity generated by this converter for electrical power output.

SUMMARY OF THE INVENTION

To minimize the limitations in the prior art described above, and to minimize other limitations that will become apparent upon reading and understanding the present specification, the present invention discloses a powerful and highly productive apparatus and method for converting constant temperature ambient heat into electricity and transferring that electricity.

The present invention solves the above-described problems by equalizing the voltage of the surface charge electrons on the plates of two different metals that, because of their material properties, generate a difference in their free electron voltage.

A method in accordance with the principles of the present invention comprises the steps of placing a plate of a first material in a medium that passes surface charge electrons but not free electrons, inserting a plate of a second material into the medium in close proximity to the plate of first material, and coupling the plate of the first material and the plate of the second material outside of the medium such that free electrons can flow between the two plates.

One aspect of the present invention is to convert constant temperature ambient heat into electrical energy. Another aspect of the present invention is to transfer electrical energy. Still another aspect of the present invention is to generate electrical energy from constant temperature ambient heat.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an apparatus and method for transferring and generating electrical energy from constant temperature ambient heat (CTAH). This is done through the use of different material properties and proper alignment of these material properties to perform the conversion, generation, and transfer functions of the invention.

Figure 1:
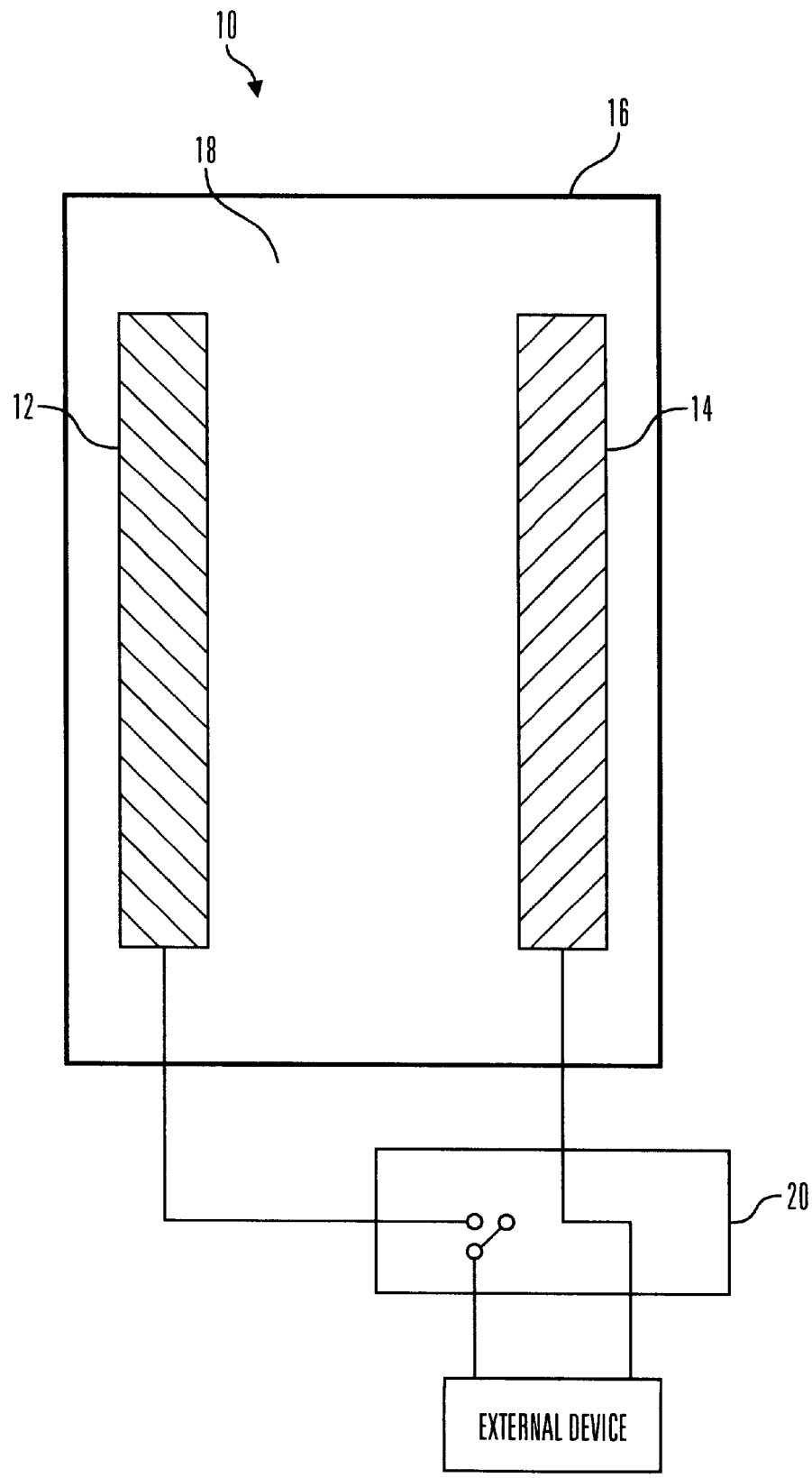
FIG. 1 is a diagram of the device of the present invention.

FIG. 1 is a diagram of the device 10 of the present invention. The device 10 comprises first material 12, second material 14, container 16, material 18, and coupling device 20.

First material 12 is typically iron, but can be another material typically used for thermocouples, such as copper, platinum, an alloy of nickel and chromium sold under the trademark CHROMEL (a trademark of the Hoskins Manufacturing Company), or any other material. Second material 14 is typically constantan, but can be another material typically used for thermocouples, such as an alloy of nickel, aluminum, manganese and silicon sold under the trademark ALUMEL (a trademark of the Hoskins Manufacturing Company), platinum doped with 10 percent rhodium, or platinum doped with 13 percent rhodium, or any other material. Further, first material 12 and second material 14 could be radioactive materials. First material 12 and second material 14 are confined in container 16 in a fixed way, such that first material 12 and second material 14 cannot move with respect to each other once the materials 12 and 14 are confined in the container 16.

The surface texture of first material 12 and second material 14 can improve the transfer of surface charge electrons. First material 12 and second material 14 can be grooved, rough, or highly polished, or first material 12 and second material 14 can have different surface textures.

The shape of first material 12 and second material 14 is not a limiting factor. First material 12 and second material 14 could be concentric tubes, or a wire of one material surrounded by a tube of another material. The increased area surrounding a wire may cause equal voltage surface charge electrons to contain a higher free electron voltage than a flat plate. Likewise, the concave surface of a tube surrounding the wire would be surrounded by a smaller space and the same voltage of the surface charge electrons would contain a lower free electron voltage.

Container 16 is typically filled with a material 18 that allows for conduction of surface charge electrons and constrained conduction of free electrons between first material 12 and second material 14. Surface charge electrons are defined to be the electrons on the surface and the area surrounding a metal. Some of the surface charge electrons are within the lattice work structure of the metal as well. Free electrons are defined as the electrons within the metal.

For materials 18 that can be readily placed between first material 12 and second material 14 without problems of leakage or containment, container 16 is not necessary for the functions of the invention. Typical materials 18 that could be used are porous dielectrics, defined as a dielectric material with holes, such as a nylon cloth. The spaces between the threads and the spaces between the fibers allow surface charge electrons to flow through the material 18. A porous dielectric will allow the flow of surface charge electrons but will prevent or reduce the flow of free electrons as defined above. Porous dielectrics may also consist of gases or a vacuum.

A non porous dielectric, defined as a material without holes, prevents the flow of both surface charge electrons and free electrons, and thus, would be unsuitable for use as material 18.

Material 18 is typically a porous dielectric nylon or plastic cloth, but can be other materials. Additionally, other materials such as gases, liquids, or solids that affect the dielectric constant of the material 18 will increase the efficiency of the device 10. The efficiency may also be increased by placing the device 10 in a region of naturally occurring electric fields, such as mineral mines, externally generated magnetic or electric fields such as those generated by magnets, or radioactive areas.

First material 12 and second material 14 are connected to coupler 20. Coupler 20 selectively allows the flow of free electrons between first material 12 and second material 14. A nucleaic attraction force, defined as the attraction force exerted on free electrons by the nucleus of an atom or molecule, is what causes free electron flow. Further, the voltage present on the free electrons is determined by the sum of the compressive forces exerted by the surface charge electrons and the nucleaic attraction force.

First material 12 and second material 14, because they are made of different substances like iron and constantan, will have a voltage differential between the two materials 12 and 14. At room temperature, iron and constantan have a difference of approximately 1 millivolt (mV). Other materials may have a higher difference. Further, iron and constantan have a voltage difference of 30 mV at 1200° F.

When coupler 20 is a switch, and the switch is in an open position, surface charge electrons will flow from first material 12 to second material 14 through medium 18 until the voltage of the surface charge electrons on both the first material 12 and the second material 14 are equal. Since the nucleaic attraction force of first material 12 is higher than second material 14, and the voltage on the free electrons is the sum of the voltage of the surface charge electrons and the nucleaic attraction force, the voltage of the free electrons on first material 12 will be greater than the voltage of the free electrons on second material 14. CTAH will be absorbed in this process of transferring surface charge electrons to a state of equilibrium, called equalization.

Thus, if the two plates are allowed to remain unconnected for a period of time, free electrons will be stored at a higher voltage on the first material 12. Once coupler 20 is placed in a state that will allow current to flow through coupler 20, e.g., the switch is closed, free electrons will flow through the external device as the voltages of the free electrons are equalized.

If the flow of surface charge electrons through medium 18 is equal to the flow of free electrons through the load, the operation becomes continuous. CTAH will thus be continuously absorbed and converted into electrical energy.

Figure 2:
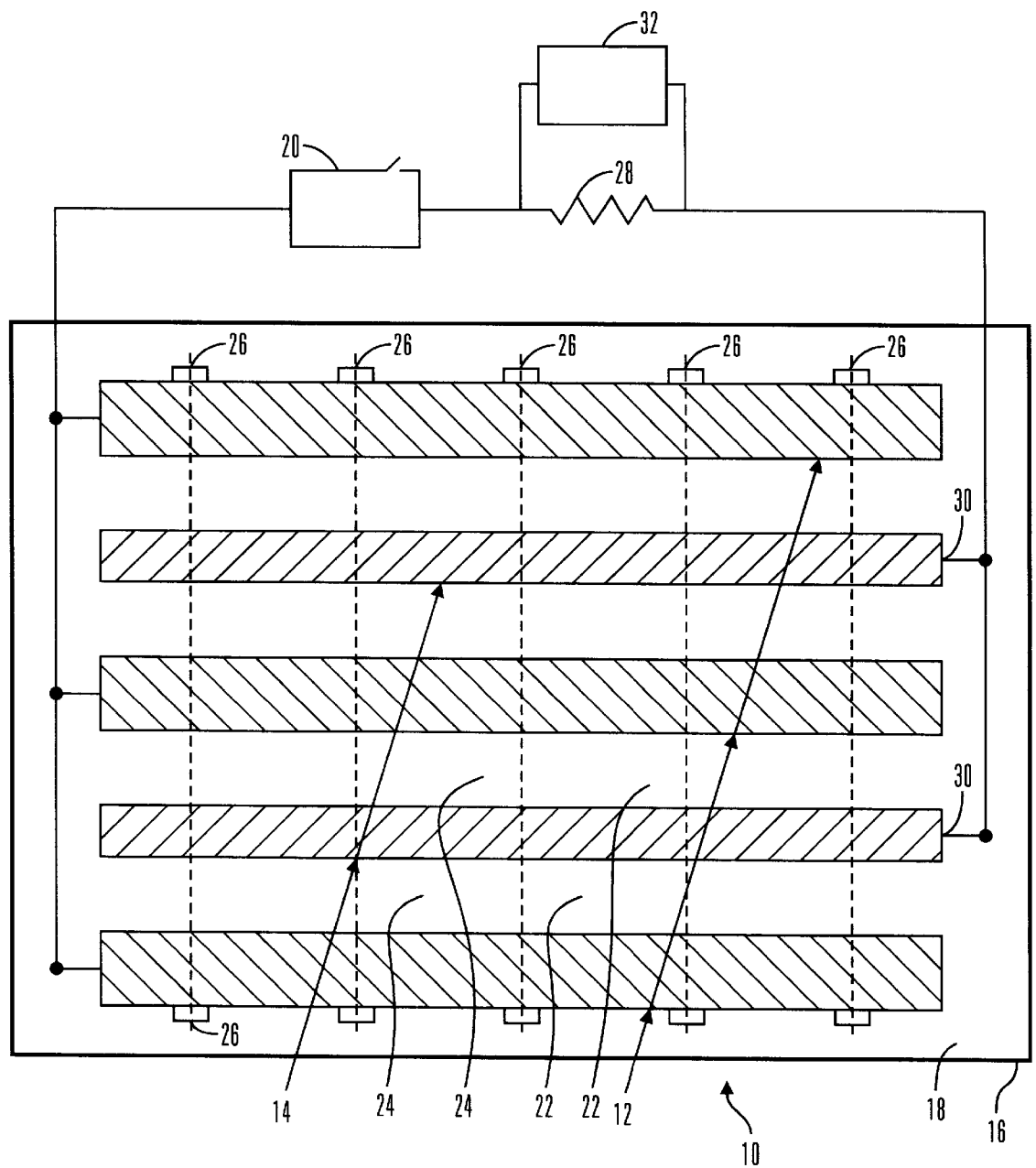
FIG. 2 is a diagram of a second embodiment of the device of the present invention.

FIG. 2 is a diagram of a second embodiment of the device 10 of the present invention. The first material 12 and the second material 14 can be a series of plates stacked in parallel, one on top of the other, with a gap between the first material 12 and the second material 14. The gap 22 and gap 24 do not have to be the same size. The first material 12 and the second material 14 are again enclosed in container 16, and material 18 encapsulates both first material 12 and second material 14. Clamps 26 hold first material 12 and second material 24 together at appropriate places along the materials 12 and 14. Coupler 20 is again connected to the device 10, and external device 28 is connected in series with the coupler 20 and the device 10.

There is a difference in the nucleaic electron attraction forces in the first material 12 and the second material 14 at the operating temperature of the device 10. The difference may be an inherent factor of the materials, or induced by external factors such as electrical surcharge, surface texture, shape, spacing, tension, compression, bulk compression, work hardening, or other factors.

The increased surface area of first material 12 and second material 14 as shown in FIG. 2 will generate a larger electron base for capacitive charge transfer, just as larger plates on a capacitor increase the capacitive ability of a storage capacitor.

The basis of operation for the device 10 is the prevention of an eddy current at a given point in the device 10. An eddy current requires an exchange of free electrons and surface charge electrons across a bimetallic boundary. If surface charge electrons only are transferred, no eddy current exists, such as in the material 18. The eddy current occurs at points 30, where second material 14 joins a wire of first material 12.

As free electrons are converted into surface charge electrons, heat is absorbed at point 30, similar to evaporation in liquids. This happens in the constantan plate of an iron-constantan device 10.

Experimental Results

Meter 32 was attached in parallel across external device 28. External device 28 was a 300 megaohm resistor. First material 12 was iron, and second material 14 was constantan. Medium 18 was a porous dielectric, namely 0.014" thick polyester cloth. The area of the plates was 127.5 square inches.

The device 10 was maintained at a temperature of 95 degrees Fahrenheit. When coupler 20 was closed, the output voltage across the external device 28 was 1.0 mV.

Device 10 was then brought down to a temperature of 65 degrees Fahrenheit. The output voltage across the external device 28 was 0.0 mV.

The differential voltage of the nucleaic attraction force at 95 degrees Fahrenheit is 1 mV, which agrees with the experimental results. Similarly, the differential voltage of the nucleaic attraction force at 65 degrees Fahrenheit is 0 mV. Since the area of the plates was small, and the thickness of the medium 18 was large, the flow of surface charge electrons was small, and thus, it was necessary to increase the load to 300 megaohms to allow the flow of surface charge electrons between the first material 12 and the second material 14 to equal the flow of free electrons through the load.

Figure 3:
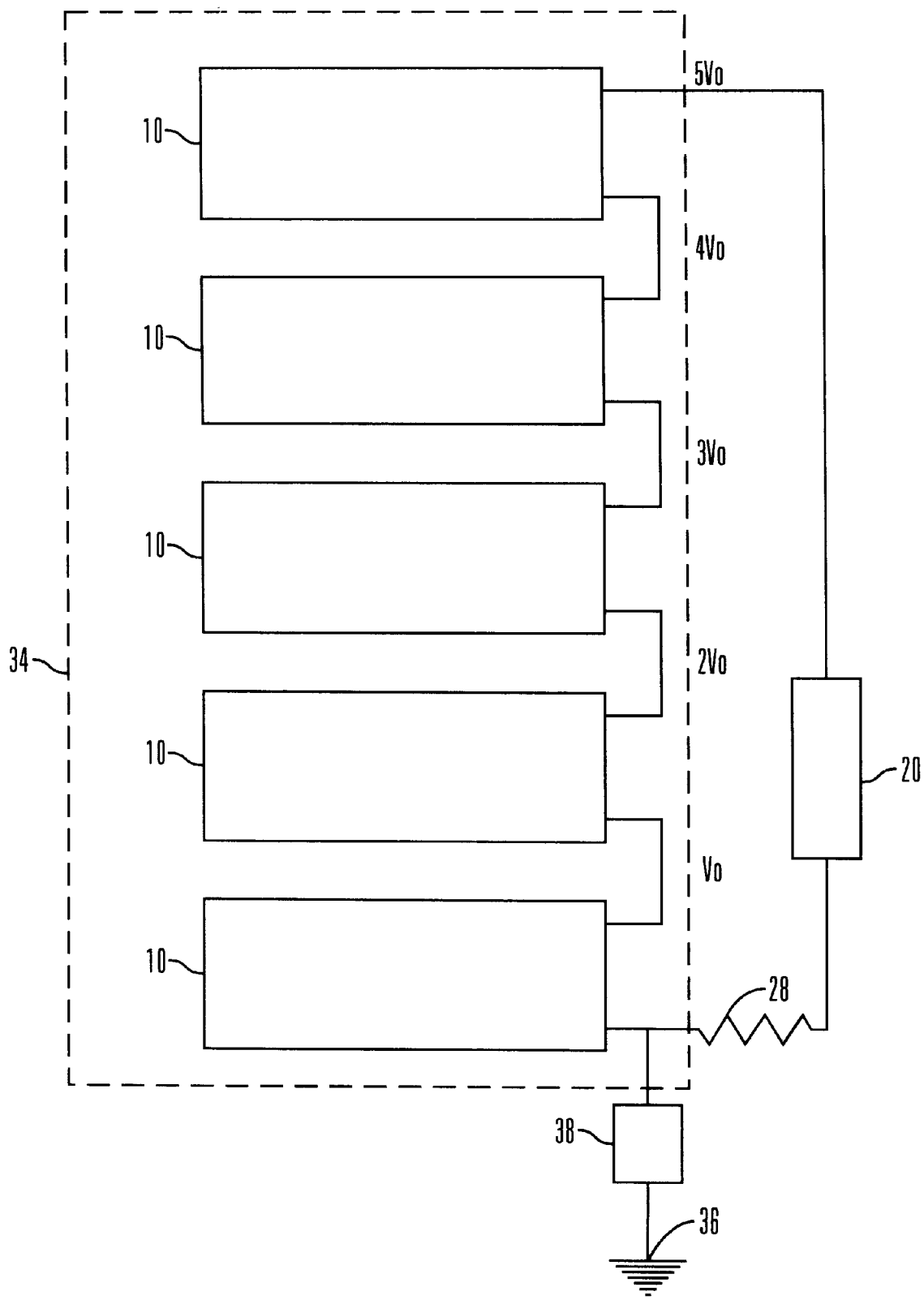
FIG. 3 is a diagram of a third embodiment of the present invention.

FIG. 3 is a diagram of a third embodiment of the device 10 of the present invention. Device 10 can be connected to other devices 10 in series to increase the voltage output of the present invention. Each device 10 has an output voltage of Vo. Thus, placing several devices 10 in series will be multiples of Vo, as shown in FIG. 3. For illustrative purposes only, five devices 10 are placed in series. Thus, the output of the entire stack will be 5Vo. Using a different number of devices 10 in series will produce a different output voltage of the stack 34.

In addition, stack 34 can be offset from ground 36 (zero volts) by placing a bias voltage generator 38 in series with stack 34 or with an individual device 10. Increasing or decreasing the bias voltage of bias generator 38 may increase the flow of surface charge electrons between first material 12 and second material 14. By connecting the bias voltage generator 38 and stack 34 properly, the voltage generated will be either above or below ground 36 potential. Bias voltage generator 38 is typically a battery, but can be any electrical device capable of generating a voltage, or could be another device 10 or another series of devices 10. Coupler 20 also preserves bias voltage generator 38 by preventing current flow when coupler 20 is not allowing stack 34 to pass current through external device 28. This will increase the life of bias voltage generator 38.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An electrical device, comprising:
    a first charge plate comprising a first material;
    a second charge plate comprising a second material which is different from the first material;
    said first and second charge plates being disposed in a common thermal environment, free of differential application of thermal energy;
    a third material coupled between and fixedly separating the first and second charge plates, wherein the third material allows a flow of surface charge electrons between the first charge plate and the second charge plate and restricts a flow of free electrons between the first charge plate and the second charge plate; and
    a coupling device, coupled to the first charge plate and the second charge plate, for allowing a flow of free electrons between the first charge plate and the second charge plate.

2. The electrical device of claim 1, wherein the coupling device is a switch.

3. The electrical device of claim 1, wherein the third material is a porous dielectric.

4. The electrical device of claim 3, wherein the flow of surface charge electrons through the porous dielectric is essentially unrestricted.

5. The electrical device of claim 1, wherein the first charge plate is comprised of a material selected from a group consisting of copper, iron, platinum, and an alloy of nickel and chromium.

6. The electrical device of claim 1, wherein the second charge plate is comprised of a material selected from a group consisting of constantan, platinum with 10 percent rhodium, platinum with 13 percent rhodium, and an alloy of nickel, aluminum, manganese and silicon.

7. The electrical device of claim 1, wherein the coupling device couples the first and second charge plates to an external device.

8. The electrical device of claim 1, wherein the coupling device selectively allows a flow of free electrons between the first charge plate and the second charge plate.

9. The electrical device of claim 1, wherein a surface texture of the first charge plate is different than a surface texture of the second charge plate.

10. The electrical device of claim 1, wherein a surface texture of the first charge plate is the same as a surface texture of the second charge plate.

11. A method of making an electrical device, comprising the steps of:
    placing a first plate comprising a first material in a medium that passes surface charge electrons but does not pass free electrons;
    placing a second plate comprising a second material which is different from the first material into the medium in close proximity to the first plate;
    disposing said first and second charge plates in a common thermal environment, free of differential application of thermal energy; and
    coupling the first plate and the second plate outside of the medium such that free electrons can flow between the first plate and the second plate.

12. The method of claim 11, wherein the first plate is comprised of a material selected from a group consisting of copper, iron, platinum, and an alloy of nickel and chromium.

13. The method of claim 11, wherein the second plate is comprised of a material selected from a group consisting of constantan, platinum with 10 percent rhodium, platinum with 13 percent rhodium, and an alloy of nickel, aluminum, manganese and silicon.

14. A method of converting energy, comprising the steps of:
    placing a first plate comprising a first material in a dielectric medium;
    placing a second plate comprising a second material which is different from the first material into the dielectric medium, in close proximity to the first plate;
    disposing said first and second charge plates in a common thermal environment, free of differential application of thermal energy; and
    coupling the first plate and the second plate outside of the dielectric medium such that only surface charge electrons flow between the first and second plates through the medium, and free electrons flow outside the medium.

15. The method of claim 14, wherein the first plate is comprised of a material selected from a group consisting of copper, iron, platinum, and an alloy of nickel and chromium.

16. The method of claim 14, wherein the second plate is comprised of a material selected from a group consisting of constantan, platinum with 10 percent rhodium, platinum with 13 percent rhodium, and an alloy of nickel, aluminum, manganese and silicon.

* * * * *